(12) United States Patent
Yura et al.

(10) Patent No.: US 11,658,280 B2
(45) Date of Patent: May 23, 2023

(54) LITHIUM SECONDARY BATTERY AND CARD WITH BUILT-IN BATTERY

(71) Applicant: NGK INSULATORS, LTD., Nagoya (JP)

(72) Inventors: Yukinobu Yura, Nagoya (JP); Masahiko Hibino, Nagoya (JP); Yuki Fujita, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 341 days.

(21) Appl. No.: 16/919,552

(22) Filed: Jul. 2, 2020

(65) Prior Publication Data

US 2020/0335768 A1    Oct. 22, 2020

Related U.S. Application Data

(63) Continuation of application No. PCT/JP2019/007460, filed on Feb. 27, 2019.

(30) Foreign Application Priority Data

Mar. 28, 2018 (JP) .............................. JP2018-063171

(51) Int. Cl.
*H01M 4/131* (2010.01)
*H01M 4/133* (2010.01)
(Continued)

(52) U.S. Cl.
CPC .......... *H01M 4/131* (2013.01); *H01M 4/133* (2013.01); *H01M 4/661* (2013.01);
(Continued)

(58) Field of Classification Search
CPC ........ H01M 4/131; H01M 4/66; H01M 4/133; H01M 4/20
See application file for complete search history.

(56) References Cited

U.S. PATENT DOCUMENTS 9,379,375 B2   6/2016 Sugiura et al.
10,454,109 B2  10/2019 Ohira et al.
(Continued)

FOREIGN PATENT DOCUMENTS

JP    2003-282148 A1   10/2003
JP    2005-142149 A1   6/2005
(Continued)

OTHER PUBLICATIONS

Machine Translation of: Takami et al. (JP 2003/282148 A), Oct. 3, 2003.*

(Continued)

*Primary Examiner* — Kenneth J Douyette
(74) *Attorney, Agent, or Firm* — Burr Patent Law, PLLC

(57) ABSTRACT

Provided is a lithium secondary battery including: a positive electrode plate which is a lithium complex oxide sintered plate; a negative electrode layer containing carbon; a separator interposed between the positive electrode plate and the negative electrode layer; and an electrolytic solution with which the positive electrode plate, the negative electrode layer, and the separator are impregnated, wherein the positive electrode plate has a thickness of 70 to 120 μm, the negative electrode layer has a thickness of 90 to 170 μm, the lithium secondary battery has a rectangular flat plate shape with each side having a length of 20 to 55 mm, the lithium
(Continued)

secondary battery has a thickness of 350 to 500 µm, and the lithium secondary battery has an energy density of 200 to 300 mWh/cm$^3$.

12 Claims, 6 Drawing Sheets

(51) Int. Cl.
| | |
|---|---|
| H01M 4/66 | (2006.01) |
| H01M 50/46 | (2021.01) |
| H01M 50/54 | (2021.01) |
| H01M 10/0525 | (2010.01) |
| H01M 50/55 | (2021.01) |
| H01M 50/553 | (2021.01) |
| H01M 50/429 | (2021.01) |
| H01M 50/414 | (2021.01) |
| H01M 50/417 | (2021.01) |
| H01M 50/119 | (2021.01) |
| H01M 50/124 | (2021.01) |
| H01M 50/121 | (2021.01) |
| H01M 4/02 | (2006.01) |

(52) U.S. Cl.
CPC ..... *H01M 10/0525* (2013.01); *H01M 50/119* (2021.01); *H01M 50/121* (2021.01); *H01M 50/124* (2021.01); *H01M 50/414* (2021.01); *H01M 50/417* (2021.01); *H01M 50/429* (2021.01); *H01M 50/46* (2021.01); *H01M 50/54* (2021.01); *H01M 50/55* (2021.01); *H01M 50/553* (2021.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 10,581,114 B2 | 3/2020 | Ohwada et al. | |
| 10,629,905 B2 | 4/2020 | Yura et al. | |
| 2004/0001999 A1* | 1/2004 | Oogami | H01M 50/562 429/162 |
| 2010/0062341 A1* | 3/2010 | Hambitzer | H01M 4/38 429/231.95 |
| 2011/0165452 A1* | 7/2011 | Ahn | H01M 10/04 361/752 |
| 2015/0311512 A1* | 10/2015 | Paulsen | C01G 51/42 429/219 |
| 2018/0233731 A1* | 8/2018 | Yura | C01G 51/42 |

FOREIGN PATENT DOCUMENTS

| | | |
|---|---|---|
| JP | 2006-004816 A2 | 1/2006 |
| JP | 2012-009194 A1 | 1/2012 |
| JP | 5587052 B2 | 9/2014 |
| JP | 2017-079192 A1 | 4/2017 |
| WO | 2016/092888 A1 | 6/2016 |
| WO | 2017/146088 A1 | 8/2017 |
| WO | 2017/188232 A1 | 11/2017 |
| WO | WO-2017-118238 A1 * | 11/2017 |

OTHER PUBLICATIONS

English translation of the Written Opinion (Application No. PCT/JP2019/007460) dated Apr. 9, 2019.
Korean Office Action (Application No. 10-2020-7016493) dated Aug. 26, 2021 (with English translation).

* cited by examiner

LITHIUM SECONDARY BATTERY AND CARD WITH BUILT-IN BATTERY

CROSS-REFERENCE TO RELATED APPLICATIONS

This application is a continuation application of PCT/JP2019/007460 filed Feb. 27, 2019, which claims priority to Japanese Patent Application No. 2018-063171 filed Mar. 28, 2018, the entire contents all of which are incorporated herein by reference.

BACKGROUND OF THE INVENTION

1. Field of the Invention

The present invention relates to a lithium secondary battery and a card with built-in battery.

2. Description of the Related Art

In recent years, smart cards with built-in battery are being put into practical use. Examples of smart cards with built-in primary battery include credit cards with one-time password display function. Examples of smart cards with built-in secondary battery include cards with fingerprint authentication and wireless communication functions provided with wireless communication IC, ASIC for fingerprint analysis, and a fingerprint sensor. Such batteries for smart cards are generally required to have properties such as a thickness of less than 0.45 mm, a high capacity and a low resistance, a bending resistance, and a thermal resistance to withstand the processing temperature.

Secondary batteries or cards with secondary battery for such applications have been proposed. For example, Patent Literature 1 (JP2017-79192A) discloses a secondary battery to be built in a plate member such as a card and having a sufficient strength even in the case where the plate member is bent and deformed. The secondary battery includes an electrode assembly including a positive electrode and a negative electrode, a sheet-like laminate film-covered body the outer peripheral side of which is welded while covering the electrode assembly, and a positive electrode connection terminal and a negative electrode connection terminal with one end side connected to the electrode assembly and the other end side extending outward from the laminate film-covered body. In this secondary battery, a powder-dispersed positive electrode (so-called coated electrode) produced by applying a positive electrode mixture containing a positive electrode active material, a conductive agent, a binder, and the like, followed by drying, is employed. Meanwhile, Patent Literature 2 (WO2016/092888) discloses a foldable battery module provided with a plurality of solid-state batteries on a foldable substrate for applications such as smart cards, wherein a lithium complex oxide sintered body with the (003) plane oriented in the direction from the positive electrode layer toward the negative electrode layer is used as a positive electrode layer.

Meanwhile, such powder-dispersed positive electrodes generally contain a relatively large amount (e.g., about 10% by weight) of components (binders and conductive agents) that do not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder or conductive agent, high capacity and satisfactory charge/discharge efficiency can be expected due to a high packing density of lithium complex oxide. For example, Patent Literature 3 (JP5587052B) discloses a positive electrode including a positive electrode current collector and a positive electrode active material layer connected to the positive electrode current collector with a conductive bonding layer therebetween. The positive electrode active material layer is composed of a lithium complex oxide sintered plate, and the sintered plate has a thickness of 30 μm or more, a porosity of 3 to 30%, and an open pore rate of 70% or more. Further, Patent Literature 4 (WO2017/146088) discloses use of an oriented sintered plate including a plurality of primary grains composed of lithium complex oxide such as lithium cobaltate (LiCoO$_2$), the plurality of primary grains being oriented at an average orientation angle of over 0° and 30° or less to the plate face in the positive electrode plate, as a positive electrode of a lithium secondary battery including a solid electrolyte.

CITATION LIST

Patent Literature

Patent Literature 1: JP2017-79192A
Patent Literature 2: WO2016/092888
Patent Literature 3: JP5587052B
Patent Literature 4: WO2017/146088

SUMMARY OF THE INVENTION

However, such a conventional lithium secondary battery for cards as disclosed in Patent Literature 1 does not have sufficient energy density to drive various ICs. Further, though having sufficient energy density, the secondary battery as disclosed in Patent Literature 2 is an all-solid battery that does not contain an electrolytic solution, and therefore the positive electrode is easily deteriorated when a large current is instantaneously applied. In particular, not only high energy density and high capacity but also excellent charge/discharge cycle performance is desired for secondary batteries for cards which are repeatedly charged and discharged at high frequency, so that the capacity does not easily decrease even when charging/discharging is performed an extremely large number of times.

The inventors have now found that, in a thin lithium secondary battery for cards including a positive electrode sintered plate, a lithium secondary battery exhibiting excellent charge/discharge cycle performance while having high energy density and high capacity can be provided by setting the thickness of the positive electrode plate, the thickness of the negative electrode layer, and the size and the thickness of the lithium secondary battery within predetermined numerical ranges.

Accordingly, an object of the present invention is to provide a thin lithium secondary battery for cards exhibiting excellent charge/discharge cycle performance while having high energy density and high capacity.

According to an aspect of the present invention, there is provided a lithium secondary battery comprising:
a positive electrode plate which is a lithium complex oxide sintered plate;
a negative electrode layer containing carbon;
a separator interposed between the positive electrode plate and the negative electrode layer; and
an electrolytic solution with which the positive electrode plate, the negative electrode, and the separator are impregnated,
wherein the positive electrode plate has a thickness of 70 to 120 μm, the negative electrode layer has a thickness of 90 to 170 μm, the lithium secondary battery has a rectangular flat plate shape with each side having a length of 20 to 55 mm, the lithium secondary battery has a thickness of 350 to 500 μm, and the lithium secondary battery has an energy density of 200 to 300 mWh/cm$^3$.

According to another aspect of the present invention, there is provided a card with built-in battery, comprising: a resin substrate; and the aforementioned lithium secondary battery embedded within the resin substrate.

BRIEF DESCRIPTION OF THE DRAWINGS

FIG. 2B includes an image of a film-covered battery at the right end.

DETAILED DESCRIPTION OF THE INVENTION

Lithium Secondary Battery

Figure 1:
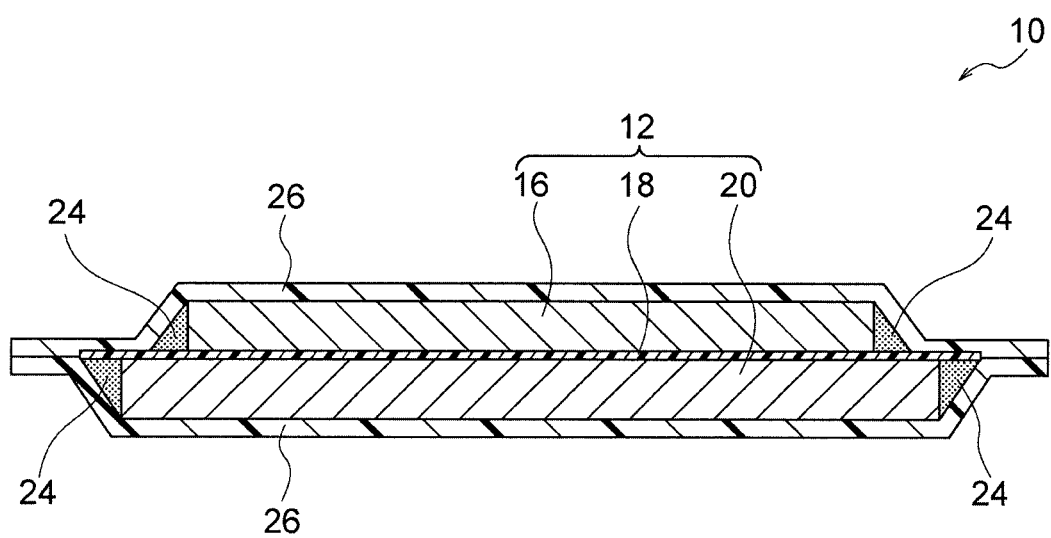
FIG. 1 is a schematic sectional view of an example of a lithium secondary battery of the present invention.

FIG. 1 schematically shows an example of the lithium secondary battery of the present invention. A lithium secondary battery 10 shown in FIG. 1 includes a positive electrode plate 16, a negative electrode layer 20, a separator 18, and an electrolytic solution 24. The positive electrode plate 16 is a lithium complex oxide sintered plate. The negative electrode layer 20 contains carbon. The separator 18 is interposed between the positive electrode plate 16 and the negative electrode layer 20. The positive electrode plate 16, the negative electrode layer 20, and the separator 18 are impregnated with the electrolytic solution 24. The positive electrode plate 16 has a thickness of 70 to 120 μm, and the negative electrode layer 20 has a thickness of 90 to 170 μm. Further, the lithium secondary battery 10 has a rectangular flat plate shape with each side having a length of 20 to 55 mm. Further, the lithium secondary battery 10 has a thickness of 350 to 500 μm. Further, the lithium secondary battery 10 has an energy density of 200 to 300 mWh/cm$^3$. In this way, in a thin lithium secondary battery for cards including a positive electrode sintered plate, a lithium secondary battery exhibiting excellent charge/discharge cycle performance while having high energy density and high capacity, as described above, can be provided by setting the thickness of the positive electrode plate 16, the thickness of the negative electrode layer 20, and the size and the thickness of the lithium secondary battery 10 within the predetermined numerical ranges.

That is, such a conventional lithium secondary battery for cards as disclosed in Patent Literature 1 does not have sufficient energy density to drive various ICs. Further, though having sufficient energy density, the secondary battery as disclosed in Patent Literature 2 is an all-solid battery that does not contain an electrolytic solution, and therefore the positive electrode is easily deteriorated when a large current is instantaneously applied. In particular, not only high energy density and high capacity but also excellent charge/discharge cycle performance is desired for secondary batteries for cards which are repeatedly charged and discharged at high frequency, so that the capacity does not easily decrease even when charging/discharging is performed an extremely large number of times. In this respect, the lithium secondary battery of the present invention can sufficiently satisfy such requirements. Accordingly, the lithium secondary battery 10 of the present invention is preferably a thin secondary battery capable to be built in a card, more preferably a thin secondary battery for being embedded in a resin substrate to form a card. That is, another preferable aspect of the present invention provides a card with built-in battery including a resin substrate and a lithium secondary battery embedded in the resin substrate. The card with built-in battery typically includes a pair of resin films and a lithium secondary battery interposed between the pair of resin films, and the resin films are preferably bonded to each other by an adhesive or thermally fused with each other by hot pressing.

As described above, the lithium secondary battery 10 is a small and thin lithium secondary battery with high energy density. Specifically, the lithium secondary battery 10 has an energy density of 200 to 300 mWh/cm$^3$, preferably 210 to 300 mWh/cm$^3$, more preferably 225 to 295 mWh/cm$^3$, further preferably 240 to 280 mWh/cm$^3$. Further, the lithium secondary battery 10 has a thickness of 350 to 500 μm, preferably 380 to 450 μm, further preferably 400 to 430 μm. Further, the lithium secondary battery 10 has a rectangular flat plate shape with each side having a length of 20 to 55 mm. The thickness and size within such ranges are extremely advantageous for the battery to be built in a thin device such as a smart card.

The positive electrode plate 16 is a lithium complex oxide sintered plate. The fact that the positive electrode plate 16 is a sintered plate means that the positive electrode plate 16 contains no binder or conductive agent. This is because, even if a binder is contained in a green sheet, the binder disappears or burns out during firing. Then, since the positive electrode plate 16 contains no binder, there is an advantage that deterioration of the positive electrode due to the electrolytic solution 24 can be avoided. The lithium complex oxide constituting the sintered plate is particularly preferably lithium cobaltate (typically, LiCoO$_2$ (which will be hereinafter abbreviated as LCO)). Various lithium complex oxide sintered plates or LCO sintered plates are known, and those disclosed in Patent Literature 3 (JP5587052B) and Patent Literature 4 (WO2017/146088) can be used, for example.

Figure 3:
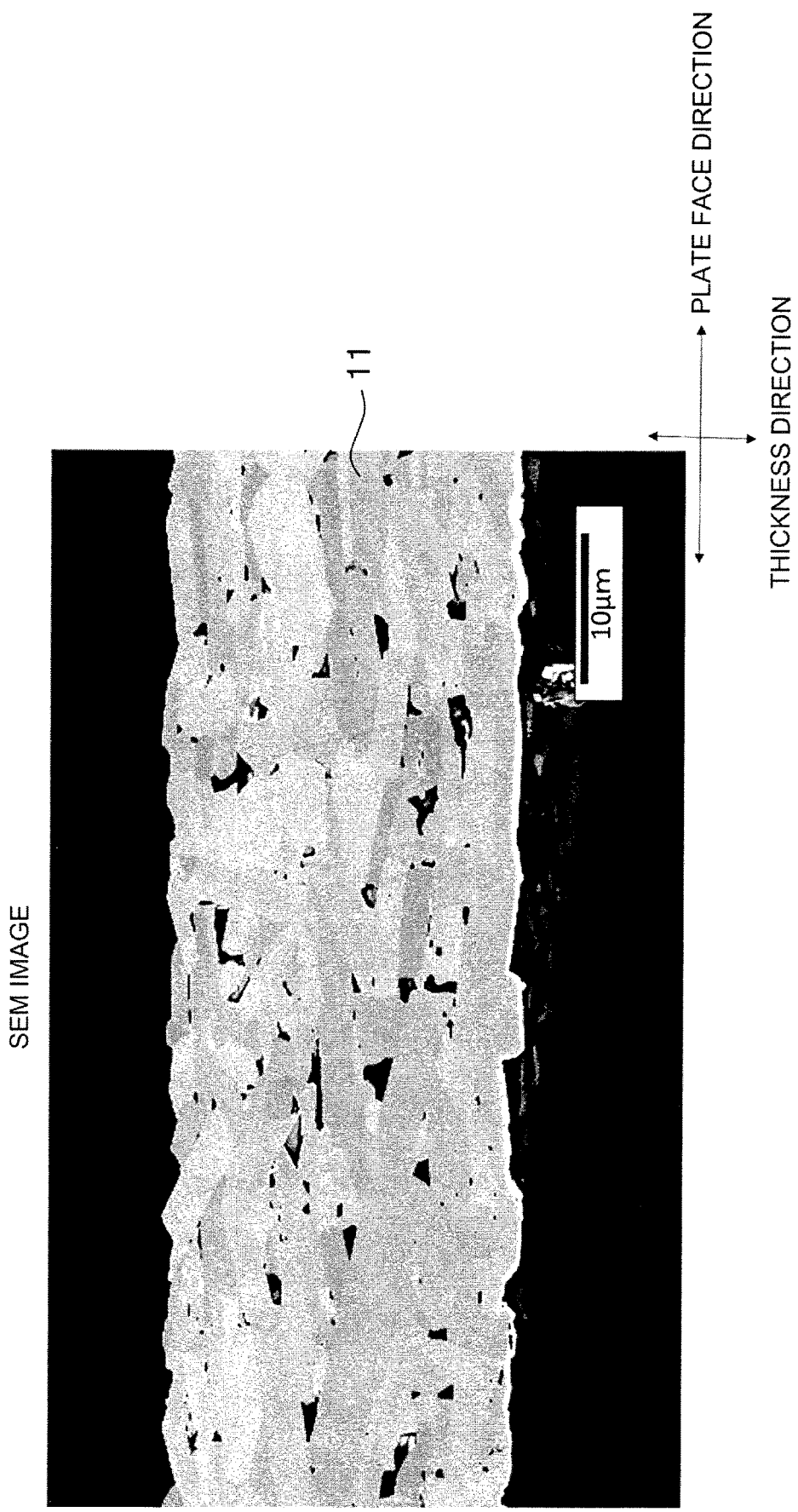
FIG. 3 is a SEM image showing an example of a cross section perpendicular to the plate face of an oriented positive electrode plate.
Figure 4:
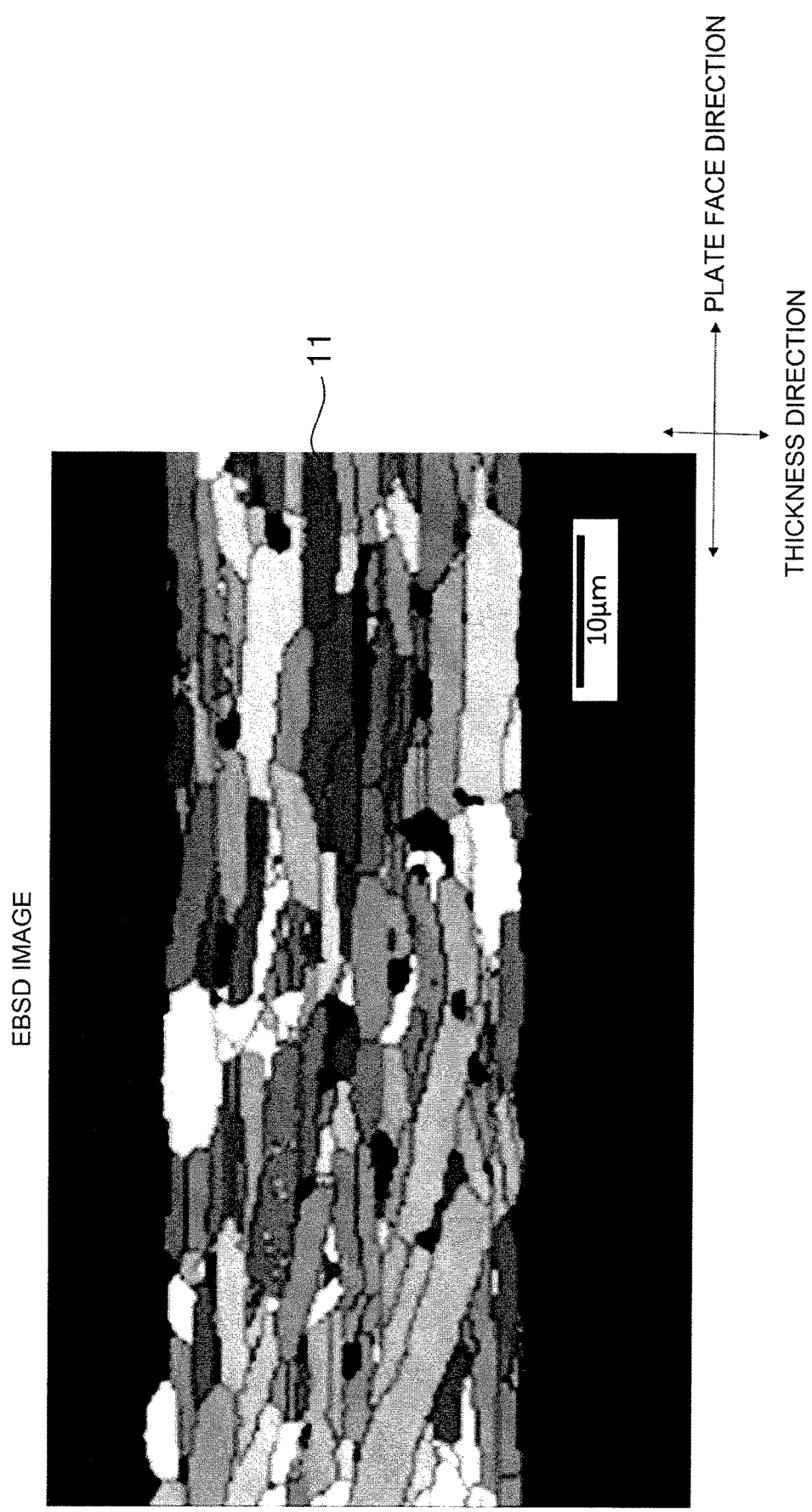
FIG. 4 is an EBSD image in the cross section of the oriented positive electrode plate shown in FIG. 3.
Figure 5:
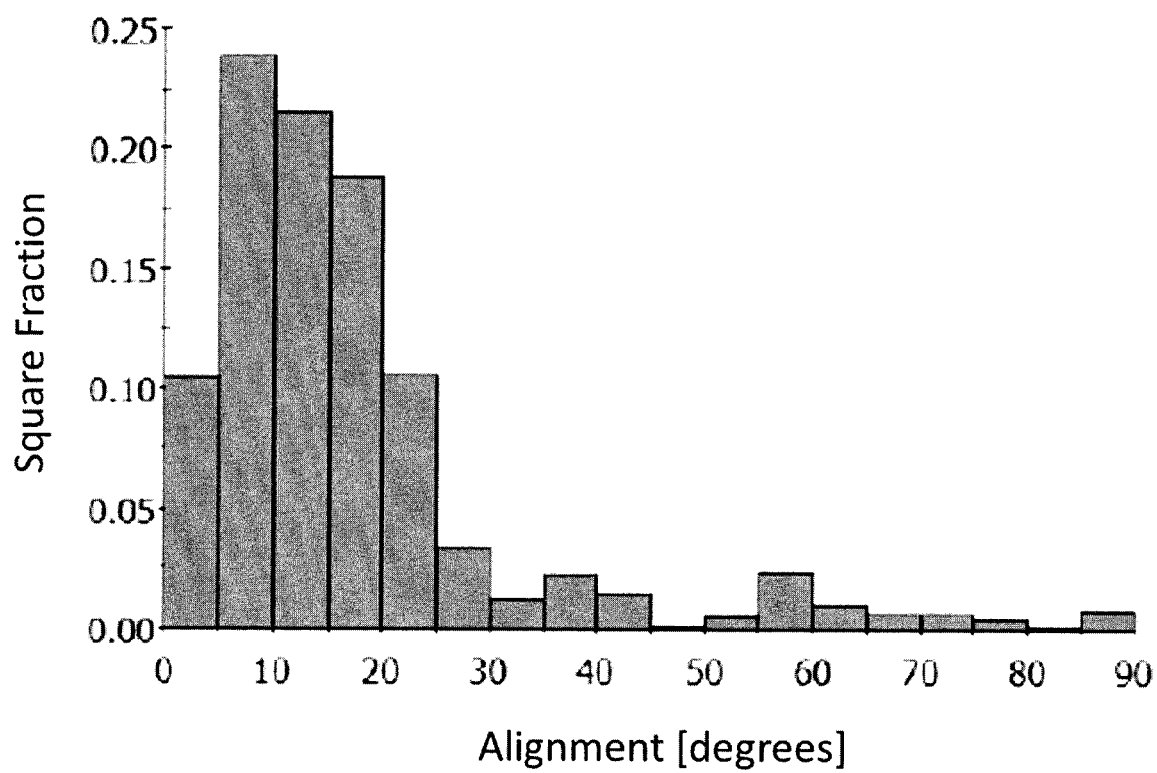
FIG. 5 is an area-based histogram showing the distribution of orientation angles of primary grains in the EBSD image shown in FIG. 4.

According to a preferable aspect of the present invention, the positive electrode plate 16, that is, the lithium complex oxide sintered plate is an oriented positive electrode plate including a plurality of primary grains composed of lithium complex oxide, the plurality of primary grains being oriented at an average orientation angle of over 0° and 30° or less to the plate face of the positive electrode plate. FIG. 3 shows an example of a SEM image in a cross section perpendicular to the plate face of the oriented positive electrode plate 16, and FIG. 4 shows an electron backscatter diffraction (EBSD: Electron Backscatter Diffraction) image in a cross section perpendicular to the plate face of the oriented positive electrode plate 16. Further, FIG. 5 shows an area-based histogram showing the distribution of orientation angles of primary grains 11 in the EBSD image shown in FIG. 4. In the EBSD image shown in FIG. 4, the discontinuity of crystal orientation can be observed. In FIG. 4, the orientation angle of each primary grain 11 is indicated by the shading of color. A darker color indicates a smaller orientation angle. The orientation angle is a tilt angle formed by plane (003) of the primary grains 11 to the plate face direction. In FIGS. 3 and 4, the points shown in black within the oriented positive electrode plate 16 represent pores.

The oriented positive electrode plate 16 is an oriented sintered body composed of the plurality of primary grains 11 bound to each other. The primary grains 11 are each mainly in the form of a plate but may include rectangular, cubic, and spherical grains. The cross-sectional shape of each primary grain 11 is not particularly limited and may be a rectangular shape, a polygonal shape other than the rectangular shape, a circular shape, an elliptical shape, or a complex shape other than above.

The primary grains 11 are composed of a lithium complex oxide. The lithium complex oxide is an oxide represented by $Li_xMO_2$ (where $0.05<x<1.10$ is satisfied, M represents at least one transition metal, and M typically contains one or more of Co, Ni, and Mn). The lithium complex oxide has a layered rock-salt structure. The layered rock-salt structure refers to a crystalline structure in which lithium layers and transition metal layers other than lithium are alternately stacked with oxygen layers interposed therebetween, that is, a crystalline structure in which transition metal ion layers and single lithium layers are alternately stacked with oxide ions therebetween (typically, an $\alpha$-$NaFeO_2$ structure, i.e., a cubic rock-salt structure in which transition metal and lithium are regularly disposed in the [111] axis direction). Examples of the lithium complex oxide include $Li_xCoO_2$ (lithium cobaltate), $Li_xNiO_2$ (lithium nickelate), $Li_xMnO_2$ (lithium manganate), $Li_xNiMnO_2$ (lithium nickel manganate), $Li_xNiCoO_2$ (lithium nickel cobaltate), $Li_xCoNiMnO_2$ (lithium cobalt nickel manganate), and $Li_xCoMnO_2$ (lithium cobalt manganate), particularly preferably $Li_xCoO_2$ (lithium cobaltate, typically $LiCoO_2$). The lithium complex oxide may contain one or more elements selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W.

As shown in FIGS. 4 and 5, the average of the orientation angles of the primary grains 11, that is, the average orientation angle is over 0° and 30° or less. This brings various advantages as follows. First, since each primary grain 11 lies in a direction inclined from the thickness direction, the adhesion between the primary grains can be improved. As a result, the lithium ion conductivity between a certain primary grain 11 and each of other primary grains 11 adjacent to the primary grain 11 on both sides in the longitudinal direction can be improved, so that the rate characteristic can be improved. Secondly, the rate characteristic can be further improved. This is because, when lithium ions move in and out, the oriented positive electrode plate 16 expands and contracts smoothly since the oriented positive electrode plate 16 expands and contracts more in the thickness direction than in the plate face direction, as described above, and thus the lithium ions also move in and out smoothly.

The average orientation angle of the primary grains 11 is obtained by the following method. First, three horizontal lines that divide the oriented positive electrode plate 16 into four equal parts in the thickness direction and three vertical lines that divide the oriented positive electrode plate 16 into four equal parts in the plate face direction are drawn in an EBSD image of a rectangular region of 95 μm×125 μm observed at a magnification of 1000 times, as shown in FIG. 4. Next, the average orientation angle of the primary grains 11 is obtained by arithmetically averaging the orientation angles of all the primary grains 11 intersecting at least one of the three horizontal lines and the three vertical lines. The average orientation angle of the primary grains 11 is preferably 30° or less, more preferably 25° or less, from the viewpoint of further improving the rate characteristics. From the viewpoint of further improving the rate characteristics, the average orientation angle of the primary grains 11 is preferably 2° or more, more preferably 5° or more.

As shown in FIG. 5, the orientation angles of the primary grains 11 may be widely distributed from 0° to 90°, but most of them are preferably distributed in the region of over 0° and 30° or less. That is, when a cross section of the oriented sintered body constituting the oriented positive electrode plate 16 is analyzed by EBSD, the total area of the primary grains 11 with an orientation angle of over 0° and 30° or less to the plate face of the oriented positive electrode plate 16 (which will be hereinafter referred to as low-angle primary grains) out of the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Thereby, the proportion of the primary grains 11 with high mutual adhesion can be increased, so that the rate characteristic can be further improved. Further, the total area of grains with an orientation angle of 20° or less among the low-angle primary grains is more preferably 50% or more with respect to the total area of 30 primary grains 11 used for calculating the average orientation angle. Further, the total area of grains with an orientation angle of 10° or less among the low-angle primary grains is more preferably 15% or more with respect to the total area of 30 primary grains 11 used for calculating the average orientation angle.

Since the primary grains 11 are each mainly in the form of a plate, the cross section of each primary grain 11 extends in a predetermined direction, typically in a substantially rectangular shape, as shown in FIGS. 3 and 4. That is, when the cross section of the oriented sintered body is analyzed by EBSD, the total area of the primary grains 11 with an aspect ratio of 4 or more in the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Specifically, in the EBSD image as shown in FIG. 4, the mutual adhesion between the primary grains 11 can be further improved by above, as a result of which the rate characteristic can be further improved. The aspect ratio of each primary grain 11 is a value obtained by dividing the maximum Feret diameter of the primary grain 11 by the minimum Feret diameter. The maximum Feret diameter is the maximum distance between two parallel straight lines that interpose the primary grain 11 therebetween on the EBSD image in observation of the cross section. The minimum Feret diameter is the minimum distance between two parallel straight lines that interpose the primary grain 11 therebetween on the EBSD image.

The mean diameter of the plurality of primary grains constituting the oriented sintered body is preferably 5 μm or more. Specifically, the mean diameter of the 30 primary grains 11 used for calculating the average orientation angle is preferably 5 μm or more, more preferably 7 μm or more, further preferably 12 μm or more. Thereby, since the number of grain boundaries between the primary grains 11 in the direction in which lithium ions conduct is reduced, and the lithium ion conductivity as a whole is improved, the rate characteristic can be further improved. The mean diameter of the primary grains 11 is a value obtained by arithmetically averaging the equivalent circle diameters of the primary grains 11. An equivalent circle diameter is the diameter of a circle having the same area as each primary grain 11 on the EBSD image.

The positive electrode plate 16 preferably includes pores. The electrolytic solution can penetrate into the sintered body by the sintered body including pores, particularly open pores, when the sintered body is integrated into a battery as a positive electrode plate. As a result, the lithium ion conductivity can be improved. This is because there are two types of conduction of lithium ions within the sintered body: conduction through constituent grains of the sintered body; and conduction through the electrolytic solution within the pores, and the conduction through the electrolytic solution within the pores is overwhelmingly faster.

The positive electrode plate 16, that is, the lithium complex oxide sintered plate preferably has a porosity of 3 to 40%, more preferably 5 to 38%, further preferably 10 to 36%, particularly preferably 20 to 35%. The stress relief effect by the pores and the increase in capacity can be expected, and the mutual adhesion between the primary grains 11 can be further improved, so that the rate characteristics can be further improved. The porosity of the sintered body is calculated by polishing a cross section of the positive electrode plate with CP (cross-section polisher) polishing, thereafter observing the cross section at a magnification of 1000 times with SEM, and binarizing the SEM image obtained. The average equivalent circle diameter of pores formed inside the oriented sintered body is not particularly limited but is preferably 8 μm or less. The smaller the average equivalent circle diameter of the pores, the mutual adhesion between the primary grains 11 can be improved more. As a result, the rate characteristic can be improved more. The average equivalent circle diameter of the pores is a value obtained by arithmetically averaging the equivalent circle diameters of 10 pores on the EBSD image. An equivalent circle diameter is the diameter of a circle having the same area as each pore on the EBSD image. Each of the pores formed inside the oriented sintered body is preferably an open pore connected to the outside of the positive electrode plate 16.

The positive electrode plate 16, that is, the lithium complex oxide sintered plate preferably has a mean pore diameter of 15 μm or less, more preferably 12 μm or less, further preferably 10 μm or less. Stress concentration is suppressed from occurring locally in large pores, and the stress is easily released uniformly in the sintered body. The lower limit of the mean pore diameter is not specifically limited, but the mean pore diameter is preferably 0.1 μm or more, more preferably 0.3 μm or more, from the viewpoint of the stress relief effect by the pores.

The thickness of the positive electrode plate 16 is 70 to 120 μm, preferably 80 to 100 μm, further preferably 80 to 95 μm, particularly preferably 85 to 95 μm. The thickness within such a range can improve the energy density of the lithium secondary battery 10 by increasing the capacity of the active material per unit area together with suppressing the deterioration of the battery characteristics (particularly, the increase of the resistance value) due to repeated charging/discharging.

The negative electrode layer 20 contains carbon as a negative electrode active material. Examples of the carbon include graphite, pyrolytic carbon, cokes, resin fired materials, mesophase small spheres, and mesophase pitches, preferably graphite. Graphite may be any of natural graphite and artificial graphite. The negative electrode layer 20 preferably further contains a binder. Examples of the binder include styrene butadiene rubber (SBR), polyvinylidene fluoride (PVDF), and polytetrafluoroethylene (PTFE), preferably styrene butadiene rubber (SBR) or polyvinylidene fluoride (PVDF). In particular, in the case of using γ-butyrolactone (GBL) having excellent heat resistance as the electrolytic solution 24, use of styrene butadiene rubber (SBR) as the binder is more preferable since it is less likely to be dissolved in GBL, and deterioration of binder functions due to heating can be avoided.

The negative electrode layer 20 has a thickness of 90 to 170 μm, preferably 95 to 160 μm, more preferably 100 to 150 μm. The thickness within such a range can improve the energy density of the lithium secondary battery 10 by increasing the capacity of the active material per unit area. Further, the density of the negative electrode layer 20 is preferably 1.15 to 1.50 g/cm$^3$, more preferably 1.20 to 1.48 g/cm$^3$, further preferably 1.25 to 1.45 g/cm$^3$. The density within such a range can improve the energy density of the lithium secondary battery 10 by increasing the capacity of the active material per unit area.

Preferable examples of the separator 18 include separators made of polyolefin, polyimide, polyester (e.g., polyethylene terephthalate (PET)), or cellulose. Examples of the polyolefin include polypropylene (PP), polyethylene (PE), and combination of these. From the viewpoint of being inexpensive, separators made of polyolefin or cellulose are preferable. Further, the surface of the separator 18 may be coated with ceramics such as alumina ($Al_2O_3$), magnesia (MgO), and silica ($SiO_2$). Meanwhile, from the viewpoint of excellent heat resistance, separators made of polyimide or cellulose are preferable. Unlike widely used separators made of polyolefin with poor heat resistance, separators made of polyimide, polyester (e.g., polyethylene terephthalate (PET)), or cellulose themselves have not only excellent heat resistance, but also the component of the electrolytic liquid, γ-butyrolactone (GBL), having excellent heat resistance exhibits excellent wettability thereon. Accordingly, in the case of using an electrolytic solution containing GBL, the electrolytic solution can sufficiently penetrate into the separator (without repelling). Separators made of polyimide are particularly preferable from the viewpoint of the heat resistance. Separators made of polyimide are commercially available and have an advantage of being capable of preventing or delaying the extension of lithium dendrite that deposits during overcharge and the resulting short circuit more effectively by having an extremely complicated microstructure.

The electrolytic solution 24 is not specifically limited, and commercially available electrolytic solutions for lithium batteries such as a solution obtained by dissolving a lithium salt (e.g., $LiPF_6$) in an organic solvent (e.g., a mixed solvent of ethylene carbonate (EC) and methylethyl carbonate (MEC), a mixed solvent of ethylene carbonate (EC) and diethyl carbonate (DEC), or a mixed solvent of ethylene carbonate (EC) and ethyl methyl carbonate (EMC)) may be used.

In the case of forming a lithium secondary battery having excellent heat resistance, the electrolytic solution 24 preferably contains lithium borofluoride (LiBF$_4$) in a non-aqueous solvent. In this case, the non-aqueous solvent may be a single solvent composed of γ-butyrolactone (GBL) or may be a mixed solvent composed of γ-butyrolactone (GBL) and ethylene carbonate (EC). The non-aqueous solvent has an increased boiling point by containing γ-butyrolactone (GBL), which considerably improves the heat resistance. From such a viewpoint, the volume ratio of EC:GBL in the non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride (LiBF$_4$) to be dissolved in the non-aqueous solvent is an electrolyte having a high decomposition temperature, which also considerably improves the heat resistance. The LiBF$_4$ concentration in the electrolytic solution 24 is preferably 0.5 to 2 mol/L, more preferably 0.6 to 1.9 mol/L, further preferably 0.7 to 1.7 mol/L, particularly preferably 0.8 to 1.5 mol/L.

The electrolytic solution 24 preferably further contains vinylene carbonate (VC) and/or fluoroethylene carbonate (FEC) and/or vinyl ethylene carbonate (VEC) as additives. Both VC and FEC have excellent heat resistance. Accordingly, a SEI film having excellent heat resistance can be formed on the surface of the negative electrode layer 20 by the electrolytic solution 24 containing such additives.

Preferably, the lithium secondary battery 10 further includes a pair of exterior films 26, the exterior films 26 have outer peripheral edges sealed with each other to form an internal space, and the internal space accommodates the battery elements 12 and the electrolytic solution 24. That is, as shown in FIG. 1, the battery elements 12 that are components of the lithium secondary battery 10 and the electrolytic solution 24 are packaged and sealed by the pair of exterior films 26. As a result, the lithium secondary battery 10 is in the form of a so-called film-covered battery. Here, the battery elements 12 are defined as containing the positive electrode plate 16, the separator 18, and the negative electrode layer 20 and typically further contain a positive electrode current collector (not shown) and a negative electrode current collector (not shown). The positive electrode current collector and the negative electrode current collector are not specifically limited but are preferably metal foils such as copper foils and aluminum foils. The positive electrode current collector is preferably interposed between the positive electrode plate 16 and the exterior film 26, and the negative electrode current collector is preferably interposed between the negative electrode layer 20 and the exterior film 26. Further, the positive electrode current collector is preferably provided with a positive electrode terminal extending from the positive electrode current collector, and the negative electrode current collector is preferably provided with a negative electrode terminal extending from the negative electrode current collector. The outer edges of the lithium secondary battery 10 are preferably sealed by the exterior films 26 thermally fused with each other. The sealing by thermal fusion is preferably performed using a heat bar (referred to also as heating bar) generally used for heat sealing applications. The outer peripheral edges of the pair of exterior films 26 are typically in the form of the four sides of the lithium secondary battery 10 and are preferably sealed throughout all the outer peripheral four sides.

Commercially available exterior films may be used as the exterior films 26. The thickness per piece of the exterior films 26 is preferably 50 to 80 μm, more preferably 55 to 70 μm, further preferably 55 to 65 μm. Preferable examples of the exterior film 26 include a laminate film containing a resin film and a metal foil, more preferably an aluminum laminate film containing a resin film and an aluminum foil. The laminate film is preferably provided with resin films on both sides of the metal foil such as an aluminum foil. In this case, it is preferable that the resin film on one side of the metal foil (which will be hereinafter referred to as a surface protective film) be composed of a material with excellent reinforcing properties such as nylon, polyamide, polyethylene terephthalate, polyimide, polytetrafluoroethylene, and polychlorotrifluoroethylene, and the resin film on the other side of the metal foil be composed of a heat sealing material such as polypropylene.

Typically, the negative electrode layer 20 has a size larger than the size of the positive electrode plate 16, and the separator 18 has a size larger than the sizes of the positive electrode plate 16 and the negative electrode layer 20. Further, the separator 18 has an outer peripheral portion in close contact with at least the outer peripheral edge of the exterior film 26 on the positive electrode plate 16 side or a peripheral region in the vicinity thereof, to separate a compartment accommodating the positive electrode plate 16 and a compartment accommodating the negative electrode layer 20 from each other. Further, the outer peripheral portion of the separator 18 may be in close contact also with the outer peripheral edge of the exterior film 26 on the negative electrode layer 20 side or a peripheral region in the vicinity thereof.

Production Method

The lithium complex oxide sintered plate in the present invention may be produced by any method and is preferably produced through (a) preparation of a green sheet containing a lithium complex oxide, (b) preparation of a green sheet containing an excess-lithium source, as required, and (c) laminating and firing of the green sheets.

(a) Preparation of Green Sheet Containing Lithium Complex Oxide

A raw material powder composed of lithium complex oxide is prepared. The powder preferably comprises pre-synthesized platy particles (e.g., LiCoO$_2$ platy particles) having a composition of LiMO$_2$ (M as described above). The volume-based D50 particle diameter of the raw material powder is preferably 0.3 to 30 μm. For example, the LiCoO$_2$ platy particles can be produced as follows. Co$_3$O$_4$ powder and Li$_2$CO$_3$ powder as raw materials are mixed and fired (500 to 900° C., 1 to 20 hours) to synthesize LiCoO$_2$ powder. The resultant LiCoO$_2$ powder is milled into a volume-based D50 particle diameter of 0.2 μm to 10 μm with a pot mill to yield platy LiCoO$_2$ particles capable of conducting lithium ions along the faces of the plate. Such LiCoO$_2$ particles are also produced by a procedure involving grain growth in a green sheet from LiCoO$_2$ powder slurry and crushing the green sheet, or a procedure involving synthesis of platy crystals, such as a flux process, a hydrothermal synthesis process, a single crystal growth process using a melt, and a sol gel process. The resultant LiCoO$_2$ particles are readily cleaved along cleavage planes. The LiCoO$_2$ particles may be cleaved by crushing to produce LiCoO$_2$ platy particles.

The platy particles may be independently used as raw material powder, or a mixed powder of the platy powder and another raw material powder (for example, $Co_3O_4$ particles) may be used as a raw material powder. In the latter case, it is preferred that the platy powder serves as template particles for providing orientation, and another raw material powder (e.g., $Co_3O_4$ particles) serves as matrix particles that can grow along the template particle. In this case, the raw powder is preferably composed of a mixed powder in a ratio of template particles to matrix particles of 100:0 to 3:97. When the $Co_3O_4$ raw material powder is used as the matrix particles, the volume-based D50 particle diameter of the $Co_3O_4$ raw material powder may be any value, for example, 0.1 to 1.0 μm, and is preferably smaller than the volume-based D50 particle diameter of $LiCoO_2$ template particles. The matrix particles may also be produced by heating a $Co(OH)_2$ raw material at 500° C. to 800° C. for 1 to 10 hours. In addition to $Co_3O_4$, $Co(OH)_2$ particles may be used, or $LiCoO_2$ particles may be used as the matrix particles.

When the raw material powder is composed of 100% of $LiCoO_2$ template particles, or when $LiCoO_2$ particles are used as matrix particles, a large (e.g., 90 mm×90 mm square) flat $LiCoO_2$ sintered plate can be yielded by firing. Although the mechanism is not clear, since synthesis of $LiCoO_2$ does not proceed in a firing process, a change in volume or local unevenness of the shape probably does not occur.

The raw material powder is mixed with a dispersive medium and any additive (e.g., binder, plasticizer, and dispersant) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is formed into a sheet to give a green sheet containing lithium complex oxide. The resultant green sheet is in a form of independent sheet. An independent sheet (also referred to as a "self-supported film") refers to a sheet (including flakes having an aspect ratio of 5 or more) that can be handled in a singular form independently apart from a support that is different therefrom. In other words, the independent sheet does not refer to a sheet that is fixed to a support that is different therefrom (such as a substrate) and integrated with the support (so as to be inseparable or hard to separate). The sheet is preferably formed by a forming procedure capable of applying a shear force to platy particles (for example, template particles) in the raw material powder. Through this process, the primary grains can have a mean tilt angle of over than 0° to 30° or less to the plate face. The forming procedure capable of applying a shear force to platy particles suitably includes a doctor blade process. The thickness of the green sheet containing the lithium complex oxide may be appropriately selected so as to give the above desired thickness after firing.

(b) Preparation of Green Sheet Containing Excess-Lithium Source (Optional Step)

Besides the above green sheet containing lithium complex oxide, another green sheet containing an excess-lithium source is then prepared, if desired. The excess-lithium source is preferably a lithium compound other than $LiMO_2$. The components other than Li in the compound evaporate during firing. A preferred example of such a lithium compound (an excess-lithium source) is lithium carbonate. The excess-lithium source is preferably powder, and has a volume-based D50 particle diameter of preferably 0.1 to 20 μm, more preferably 0.3 to 10 μm. The lithium source powder is mixed with a dispersive medium and additives (e.g., a binder, a plasticizer, and a dispersant) to form a slurry. The resultant slurry is defoamed by stirring under reduced pressure, and the viscosity is preferably adjusted into 1000 to 20000 cP. The resultant slurry is formed into a green sheet containing an excess-lithium source. The resultant green sheet is also in a form of independent sheet. The sheet can be formed by any known process and is preferably formed by a doctor blade process. The thickness of the green sheet containing the excess-lithium source is appropriately selected, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

(c) Lamination and Firing of Green Sheets

The green sheet containing the lithium complex oxide (e.g., $LiCoO_2$ green sheet) and the green sheet containing the excess-lithium source (e.g., $Li_2CO_3$ green sheet), if desired, are sequentially disposed on a bottom setter, and a top setter is disposed on the green sheets. The top and bottom setters are made of ceramic, preferably zirconia or magnesia. If the setters are made of magnesia, the pores tend to get smaller. The top setter may have a porous structure, a honeycomb structure, or a dense structure. If the top setter has a dense structure, the pores in the sintered plate readily get smaller, and the number of pores tends to get larger. As necessary, the green sheet containing the excess-lithium source is preferably cut into a size, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

After the green sheet containing the lithium complex oxide (e.g., a $LiCoO_2$ green sheet) is placed on the bottom setter, the green sheet may be optionally degreased and then calcined at 600 to 850° C. for 1 to 10 hours. In this step, the green sheet containing the excess-lithium source (e.g., a $Li_2CO_3$ green sheet) and the top setter may be sequentially disposed on the resultant calcined plate.

The green sheets and/or the calcined plate disposed between the setters are optionally degreased and heated (fired) in a medium temperature range (e.g., 700 to 1000° C.) to give a lithium complex oxide sintered plate. This firing process may be performed in one or two steps. In the case of firing in two separate steps, the temperature in the first firing step is preferably lower than that in the second firing step. The resultant sintered plate is also in a form of independent sheet.

EXAMPLES

The invention will be illustrated in more detail by the following examples.

Example 1

(1) Production of Positive Electrode Plate (1a) Preparation of $LiCoO_2$ Green Sheet As shown in Table 1, $LiCoO_2$ raw material powder was prepared and was named powder A. The resultant $LiCoO_2$ powder A (100 parts by weight), a dispersive medium (toluene:2-propanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant mixture was defoamed by stirring under reduced pressure to prepare an $LiCoO_2$ slurry with a viscosity of 4000 cP. The viscosity was measured with an LVT viscometer manufactured by Brookfield. The slurry prepared was formed into an $LiCoO_2$ green sheet onto a PET film by a doctor blade process. The dried thickness of the $LiCoO_2$ green sheet was 98 µm.

(1b) Preparation of $LiCoO_2$ Sintered Plate

The $LiCoO_2$ green sheet was separated from the PET film, and was cut into a 50 mm square. The cut piece was placed on the center of a bottom magnesia setter (dimensions: 90 mm square, height: 1 mm). A porous magnesia setter as the top setter was placed on the $LiCoO_2$ sheet. The $LiCoO_2$ sheet disposed between the setters was placed into an alumina sheath of a 120 mm square (manufactured by Nikkato Co., Ltd.). At this time, the alumina sheath was not tightly sealed, and was covered with a lid with a gap of 0.5 mm. The stack obtained was heated to 600° C. at a heating rate of 200° C./h and degreased for 3 hours, then heated to 870° C. at 200° C./h, and held for 20 hours for firing. After the firing, the fired laminate was cooled to room temperature, and was removed from the alumina sheath. Thus, the $LiCoO_2$ sintered plate with a thickness of 90 µm was yielded as a positive electrode plate. The positive electrode plate obtained was cut into a rectangular shape of 10.5 mm×9.5 mm with a laser processing machine, to obtain positive electrode plates 16 in the form of a plurality of chips.

(2) Production of Lithium Secondary Battery

Figure 2A:
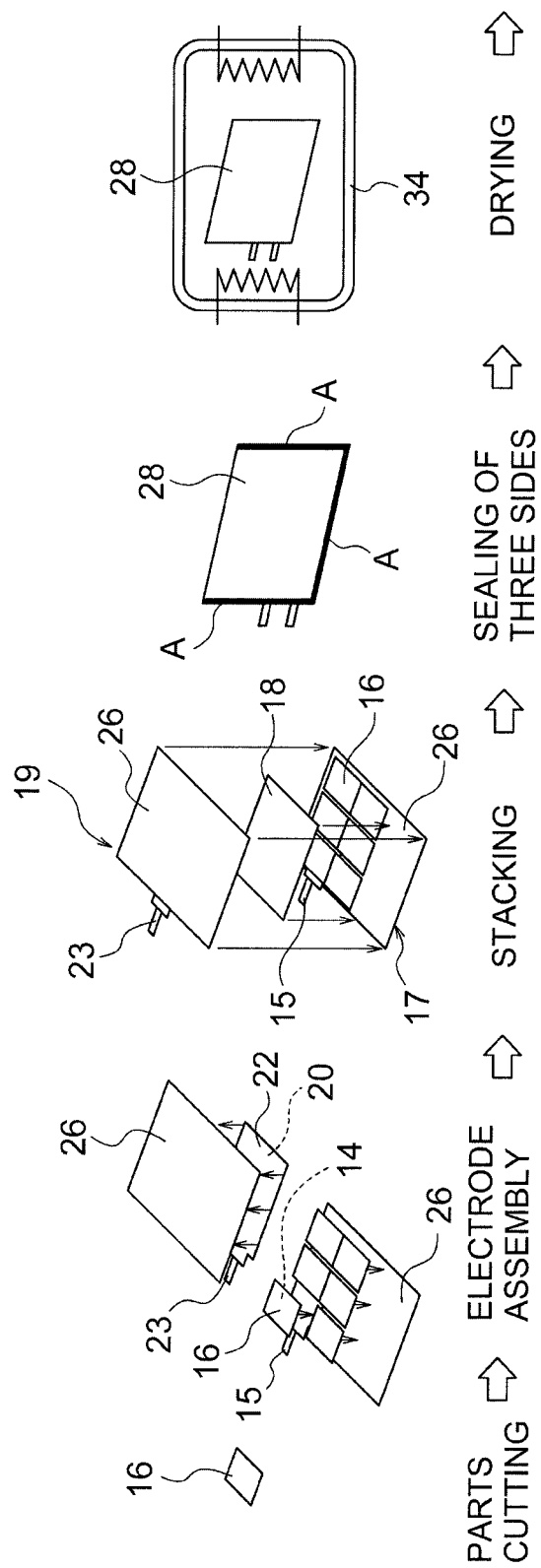
FIG. 2A illustrates an example of the first half of the production process of the lithium secondary battery.
Figure 2B:
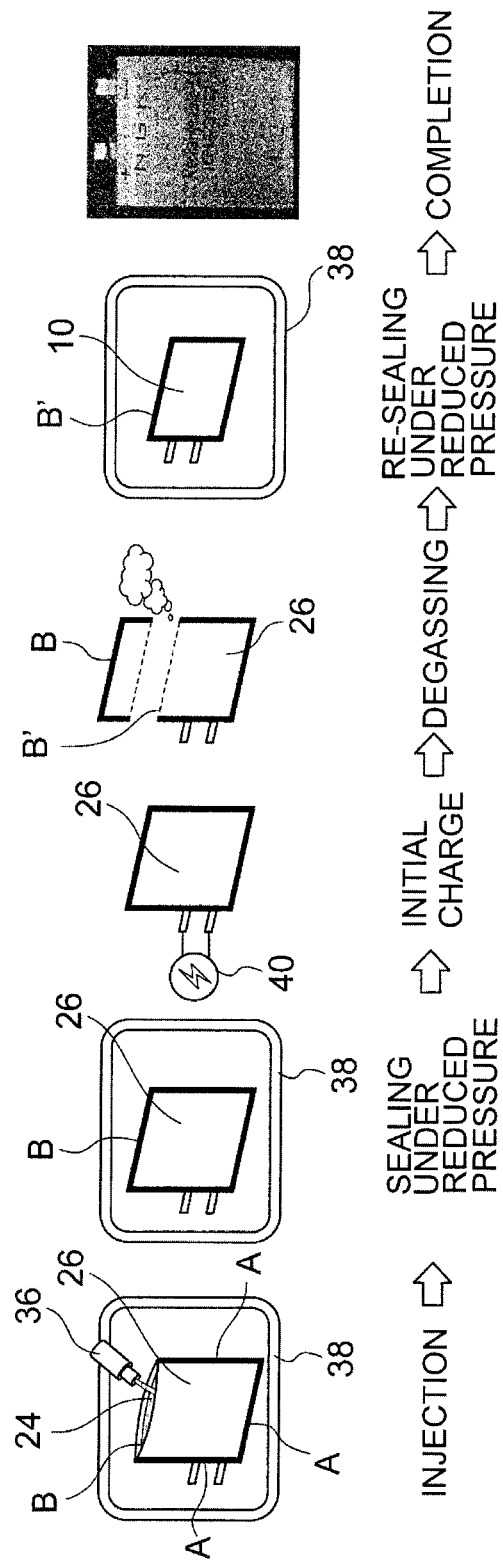
FIG. 2B illustrates an example of the latter half of the production process of the lithium secondary battery, showing steps subsequent to the steps shown in FIG. 2A.

The lithium secondary battery 10 in the form of a film-covered battery as schematically shown in FIG. 1 was produced by procedures as shown in FIGS. 2A and 2B. Specifically, the procedures were as follows.

As the exterior films 26, two pieces of aluminum laminate films (with a thickness of 61 µm and a three-layer structure of polypropylene film/aluminum foil/nylon film, manufactured by Showa Denko packaging Co., Ltd.) were prepared. As shown in FIG. 2A, the positive electrode plates 16 in the form of the plurality of chips were placed on one of the exterior films 26 via a positive electrode current collector 14 (an aluminum foil with a thickness of 9 µm), to form a positive electrode assembly 17. FIG. 2A shows the positive electrode plates 16 in the form of the plurality of chips, but there is no limitation to this, and the positive electrode plate 16 that is one piece not devided into the form of chips may be used to form the positive electrode assembly 17. At this time, the positive electrode current collector 14 was fixed to the exterior film 26 with an adhesive. A positive electrode terminal 15 was fixed to the positive electrode current collector 14 by welding so as to extend from the positive electrode current collector 14. Meanwhile, the negative electrode layer 20 (a carbon layer with a thickness of 125 µm and a density of 1.4 g/cm³) was placed on the other of the exterior films 26 via a negative electrode current collector 22 (a copper foil with a thickness of 10 µm) to form a negative electrode assembly 19. At this time, the negative electrode current collector 22 was fixed to the exterior film 26 with an adhesive. A negative electrode terminal 23 was fixed to the negative electrode current collector 22 by welding so as to extend from the negative electrode current collector 22. Further, the negative electrode layer 20 that is a carbon layer was a coated film containing a mixture of graphite as an active material and polyvinylidene fluoride (PVDF) as a binder.

As the separator 18, a porous polypropylene film (with a thickness of 25 µm and a porosity of 55%, manufactured by Polypore International, Inc.) was prepared. As shown in FIG. 2A, the positive electrode assembly 17, the separator 18, and the negative electrode assembly 19 were sequentially stacked so that the positive electrode plate 16 and the negative electrode layer 20 each face the separator 18, to obtain a laminate 28 with both sides covered by the exterior films 26 and the outer peripheral portions of the exterior films 26 protruding from the outer edges of the battery elements 12. The battery elements 12 (the positive electrode current collector 14, the positive electrode plate 16, the separator 18, the negative electrode layer 20, and the negative electrode current collector 22) thus constructed within the laminate 28 had a quadrangular shape with a size of 2.3 cm×3.2 cm and a thickness of 0.33 mm.

As shown in FIG. 2A, the three sides A of the laminate 28 obtained were sealed. The sealing was performed by hot-pressing the outer peripheral portion of the laminate 28 at 200° C. and 1.5 MPa for 15 seconds using a patch jig (heat bar) adjusted to a sealing width of 2.0 mm, to thermally fuse the outer peripheral portions of the exterior films 26 (aluminum laminate films) with each other. After sealing the three sides A, the laminate 28 was put into a vacuum dryer 34, to remove moisture and dry the adhesive.

As shown in FIG. 2B, the side B was temporarily sealed within a glovebox 38 in a reduced-pressure atmosphere with an absolute pressure of 5 kPa using a simple sealer, by inserting an injection device 36 into a gap formed between the pair of exterior films 26 on one remaining side B unsealed of the laminate 28 with the three outer edge sides A sealed, and injecting the electrolytic solution 24 therein. The electrolytic solution used was obtained by dissolving $LiPF_6$ in a mixed solvent containing ethylene carbonate (EC) and methylethyl carbonate (MEC) at 3:7 (volume ratio) to a concentration of 1.0 mol/L and further dissolving vinylene carbonate (VC) therein to a concentration of 2% by weight. Thus, the laminate with the side B temporarily sealed was initially charged, followed by aging for 7 days. Finally, the outer peripheral portion of the remaining one side B (the end portion not including the battery elements) was cut off to perform degassing.

As shown in FIG. 2B, the side B' generated by cutting off the temporary sealing was sealed within the glovebox 38 in a reduced-pressure atmosphere with an absolute pressure of 5 kPa. The sealing was performed also by hot-pressing the outer peripheral portion of the laminate 28 at 200° C. and 1.5 MPa for 15 seconds, to thermally fuse the outer peripheral portions of the exterior films 26 (aluminum laminate films) with each other. Thus, the side B' was sealed with the pair of exterior films 26, to form the lithium secondary battery 10 in the form of a film-covered battery. The lithium secondary battery 10 was taken out from the glovebox 38, and excess portions on the outer peripheries of the exterior films 26 were cut off, to adjust the shape of the lithium secondary battery 10. Thus, the lithium secondary battery 10 with the four outer edge sides of the battery elements 12 sealed by the pair of exterior films 26 and with the electrolytic solution 24 injected therein was obtained. The lithium secondary battery 10 obtained had a rectangular shape with a size of 38 mm×28 mm and a thickness of 0.40 mm.

(3) Evaluation

The LiCoO$_2$ sintered plate (positive electrode plate) prepared in Procedure (1b) and the battery manufactured in Procedure (2) were evaluated for various properties as shown below.

Average Orientation Angle of Primary Grains

The LiCoO$_2$ sintered plate was polished with a cross section polisher (CP) (IB-15000CP, manufactured by JEOL Ltd.), and the resultant cross-section of the positive electrode plate (cross-section perpendicular to the plate face of the positive electrode plate) was subjected to the EBSD measurement at a 1000-fold field of view (125 μm×125 μm) to give an EBSD image. This EBSD measurement was performed using a Schottky field emission scanning electron microscope (model JSM-7800F, manufactured by JEOL Ltd.). For all grains identified in the resultant EBSD image, the angles defined by the (003) planes of the primary grains and the plate face of the positive electrode plate (that is, the tilt of the crystal orientation from the (003) planes) is determined as a tilt angle. The mean value of the angles was determined as an average orientation angle of the primary grains.

Thickness

The LiCoO$_2$ sintered plate was polished with a cross section polisher (CP) (IB-15000CP, manufactured by JEOL Ltd.), and the resultant cross-section of positive electrode plate was observed with SEM (JSM 6390 LA, manufactured by JEOL Ltd.) to determine a thickness of the positive electrode plate. The thickness of the dried LiCoO$_2$ green sheet described above in Procedure (1a) was also determined in the same manner.

Porosity

The LiCoO$_2$ sintered plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). The SEM image was subjected to an image analysis, the area of all pores was divided by the area of the positive electrode, and the resultant value was multiplied by 100 to calculate the porosity (%).

Mean Pore Diameter

The mean pore diameter of the LiCoO$_2$ sintered plate was measured by a mercury intrusion method using a mercury porosimeter (Autopore IV 9510, manufactured by Shimadzu Corporation).

Initial Discharge Capacity

The measurement was performed by the following procedures in a potential range of 3.0 V. That is, the battery was charged at a rate of 0.2 C under a constant current until the battery voltage reached 4.3 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as an initial discharge capacity.

Energy Density

The energy density was calculated by multiplying the initial discharge capacity by the average voltage and dividing it by the battery volume. At that time, the average value of the voltages at SOC 0%, 20%, 40%, 60%, 80% and 100% was used as the average voltage.

Pulse Cycle Performance

The pulse cycle performance (discharge capacity retention) of the battery was measured in the potential range of 4.3 V to 3.0 V by the following procedures. That is, the battery was charged at a charge rate of 0.5 C under a constant current and then discharged at a current value corresponding to a discharge rate of 0.5 C for 30 seconds. The charge/discharge cycle was repeated 3000 times in total to measure the discharge capacity after pulse cycle test in the same manner as for the initial discharge capacity described above. The ratio of the discharge capacity after pulse cycle test with respect to the initial discharge capacity was calculated, and the ratio was multiplied by 100 to determine the pulse cycle performance (%) as a discharge capacity retention.

Example 2

A positive electrode plate and a battery were prepared and evaluated for the various properties as in Example 1 except that powder B composed of LiCoO$_2$ particles produced as shown in Table 1 was used instead of powder A.

Example 3

A positive electrode plate and a battery were prepared and evaluated for the various properties as in Example 1 except that 1) the thickness of LiCoO$_2$ green sheet was increased so that the thickness of the positive electrode plate was 120 μm, and 2) the thickness of the negative electrode layer was changed to 165 μm.

Example 4

A positive electrode plate and a battery were prepared and evaluated for the various properties as in Example 1 except that 1) the thickness of the LiCoO$_2$ green sheet was reduced so that the thickness of the positive electrode plate was 70 μm, and 2) the thickness of the negative electrode layer was changed to 95 μm.

Example 5

A positive electrode plate and a battery were prepared and evaluated for the various properties as in Example 1 except that powder C composed of LiCoO$_2$ platy particles produced as shown in Table 1 was used instead of powder A.

Example 6

A positive electrode plate and a battery were prepared and evaluated for the various properties as in Example 1 except that 1) a Li$_2$CO$_3$ green sheet piece produced by the following procedures was placed on the LiCoO$_2$ green sheet as an excess-lithium source before placing the top setter, and 2)

firing was performed in two-stage process at 800° C. for 5 hours and then at 900° C. for 20 hours, instead of firing at 870° C. for 20 hours.

Preparation of $Li_2CO_3$ Green Sheet
(Excess-Lithium Source)

$Li_2CO_3$ raw material powder (volume-based particle diameter D50: 2.5 µm, manufactured by THE HONJO CHEMICAL CORPORATION) (100 parts by weight), a binder (poly(vinyl butyral): Product No. BM-2, manufactured by Sekisui Chemical Co., Ltd.) (5 parts by weight), a plasticizer (di-2-ethylhexyl phthalate (DOP), manufactured by Kurogane Kasei Co., Ltd.) (2 parts by weight), and a dispersant (RHEODOL SP-030, manufactured by Kao Corporation) (2 parts by weight) were mixed. The resultant mixture was defoamed by stirring under reduced pressure to prepare a $Li_2CO_3$ slurry with a viscosity of 4000 cP. The viscosity was measured with an LVT viscometer manufactured by Brookfield. The $Li_2CO_3$ slurry prepared was formed into a sheet on a PET film by a doctor blade process, thereby forming a $Li_2CO_3$ green sheet. The dried thickness of the $Li_2CO_3$ green sheet was selected such that the Li/Co molar ratio of the Li content in the $Li_2CO_3$ green sheet to the Co content in the $LiCoO_2$ green sheet had a predetermined value. The dried $Li_2CO_3$ green sheet piece was cut into a size such that the Li/Co molar ratio of the Li content in the $Li_2CO_3$ green sheet to the Co content in the resultant calcined $LiCoO_2$ plate was 0.4.

Example 7

A positive electrode plate and a battery were prepared and evaluated for the various properties as in Example 1 except that 1) $Li_2CO_3$ raw material powder (a volume-based D50 particle diameter of 2.5 manufactured by THE HONJO CHEMICAL CORPORATION) was further added to the $LiCoO_2$ slurry to have an excess-Li/Co ratio of 0.2 in the $LiCoO_2$ green sheet, and 2) firing was performed in two-stage process at 800° C. for 5 hours and then at 900° C. for 20 hours, instead of firing at 870° C. for 20 hours. The excess-Li/Co ratio is the molar ratio of the excess-Li content derived from $Li_2CO_3$ in the $LiCoO_2$ green sheet to the Co content in the $LiCoO_2$ green sheet.

Example 8

A positive electrode plate and a battery were prepared and evaluated for the various properties as in Example 6 except that 1) the size of the $Li_2CO_3$ green sheet piece to be placed was varied so as to have a Li/Co ratio of 0.6, and 2) the $LiCoO_2$ green sheet was calcined at 700° C. for 3 hours after degreasing and before firing.

Example 9

A positive electrode plate and a battery were prepared and evaluated for the various properties as in Example 6 except that 1) the $LiCoO_2$ green sheet was calcined at 900° C. for 3 hours after degreasing and before firing, and 2) firing was performed in one-stage process at 800° C. for 10 hours instead of firing in two-stage process.

Example 10

A positive electrode plate and a battery were prepared and evaluated for the various properties as in Example 1 except that 1) the thickness of the negative electrode layer was changed to 130 µm, and 2) the density of the negative electrode layer was changed to 1.25.

Example 11

A positive electrode plate and a battery were prepared and evaluated for the various properties as in Example 1 except that 1) the thickness of the negative electrode layer was changed to 120 µm, and 2) the density of the negative electrode layer was changed to 1.5.

Example 12

A positive electrode plate and a battery were prepared and evaluated for the various properties as in Example 1 except that the size of each component was reduced so that the outer size of the battery was 20 mm×20 mm.

Example 13

A positive electrode plate and a battery were prepared and evaluated for the various properties as in Example 1 except that the size of each component was increased so that the outer size of the battery was 50 mm×50 mm.

Example 14 (Comparison)

A positive electrode plate and a battery were prepared and evaluated for the various properties as in Example 1 except that a commercially available $LiCoO_2$-coated electrode (manufactured by Hachiyama Co., Ltd.) was used as a positive electrode plate instead of the $LiCoO_2$ sintered plate. The coated electrode was prepared by applying a paste containing a positive electrode active material, followed by drying, and was not a sintered plate.

Example 15 (Comparison)

A positive electrode plate and a battery were prepared and evaluated for the various properties as in Example 6 except that 1) $Co_3O_4/Bi_2O_3$ mixture powder D produced as shown in Table 1 was used instead of powder A, 2) the size of the $Li_2CO_3$ green sheet piece to be placed was varied so as to have a Li/Co ratio of 1.2, 3) the $LiCoO_2$ green sheet was calcined at 1300° C. for 5 hours after degreasing and before firing, 4) firing was performed in one-stage process at 850° C. for 20 hours instead of firing in two-stage process, and 5) the thickness of the negative electrode layer was changed to 180 µm.

Production Conditions and Evaluation Results

Table 2 shows the production conditions in Examples 1 to 15, and Table 3 shows the evaluation results for Examples 1 to 15. Further, Table 1 shows the details of powder A to D mentioned in Table 2.

TABLE 1

| | Positive electrode raw material powder |
|---|---|
| Powder A | $LiCoO_2$ platy particles obtained by mixing $Co_3O_4$ powder (manufactured by SEIDO CHEMICAL INDUSTRY CO., LTD.) and $Li_2CO_3$ powder (manufactured by THE HONJO CHEMICAL CORPORATION) weighed so that the Li/Co molar ratio was 1.01, then holding it at 780° C. for 5 hours, and milling and crushing the resultant powder into a volume-based D50 of 0.4 µm with a pot mill |

TABLE 1-continued

| | Positive electrode raw material powder |
|---|---|
| Powder B | LiCoO₂ particles obtained by mixing Co₃O₄ powder (manufactured by ISE CHEMICALS CORPORATION) and Li₂CO₃ powder (manufactured by THE HONJO CHEMICAL CORPORATION) weighed so that the Li/Co molar ratio was 1.00, then holding it at 700° C. for 5 hours, and crushing the resultant powder into a volume-based D50 of 0.4 μm with a #500 mesh |
| Powder C | LiCoO₂ platy particles obtained by mixing Co₃O₄ powder (manufactured by ISE CHEMICALS CORPORATION) and Li₂CO₃ powder (manufactured by THE HONJO CHEMICAL CORPORATION) weighed so that the Li/Co molar ratio was 1.00, then holding it at 750 °C. for 5 hours, and crushing the resultant powder into a volume-based D50 of 0.6 μm with a pot mill |
| Powder D | Mixture powder obtained by adding 5 wt% of Bi₂O₃ powder to Co₃O₄ powder (manufactured by ISE CHEMICALS CORPORATION) |

TABLE 2

| | Positive electrode raw material powder | Li₂CO₃ (Internal) Li/Co<br>Excess-Li/Co ratio to Li₂CO₃ content in LiCoO₂ green sheet | LiCO₃ (Top) Li/Co<br>Li/Co ratio to Li₂CO₃ content in Li₂CO₃ green sheet | Calcination conditions | Main firing conditions |
|---|---|---|---|---|---|
| Example 1 | A | 0 | 0 | — | 870° C. × 20h |
| Example 2 | B | 0 | 0 | — | 870° C. × 20h |
| Example 3 | A | 0 | 0 | — | 870° C. × 20h |
| Example 4 | A | 0 | 0 | — | 870° C. × 20h |
| Example 5 | C | 0 | 0 | — | 870° C. × 20h |
| Example 6 | A | 0 | 0.4 | — | 800° C. × 5 hours and then 900° C. × 20 hours |
| Example 7 | A | 0.2 | 0 | — | 800° C. × 5 hours and then 900° C. × 20 hours |
| Example 8 | A | 0 | 0.6 | 700° C. × 3h | 800° C. × 5 hours and then 900° C. × 20 hours |
| Example 9 | A | 0 | 0.4 | 900° C. × 3h | 800° C. × 10h |
| Example 10 | A | 0 | 0 | — | 870° C. × 20h |
| Example 11 | A | 0 | 0 | 870° C. × 20h | |
| Example 12 | A | 0 | 0 | — | 870° C. × 20h |
| Example 13 | A | 0 | 0 | — | 870° C. × 20h |
| Example 14* | Commercialy available coated electrode | | | | |
| Example 15* | D | 0 | 1.2 | 1300° C. × 5h | 850° C. × 20h |

Symbol* represents a comparative example.

TABLE 3

| | Battery outline | | | Positive electrode plate | | | | | Negative electrode layer | | Battery performance | | |
|---|---|---|---|---|---|---|---|---|---|---|---|---|---|
| | Size (mm) | Thickness (mm) | Form | Average orientation angle | Thickness (μm) | Porosity (%) | Mean porosity (μm) | | Density (g/cm³) | Thickness (μm) | Energy density (mWh/cm³) | Initial discharge capacity (mAh) | Pulse cycle performance (%) |
| Example 1 | 38 28 | 0.40 | Sintered plate | 16° | 90 | 30 | 0.8 | | 1.4 | 125 | 260 | 28 | 99 |
| Example 2 | 38 28 | 0.40 | Sintered plate | Random | 90 | 30 | 0.8 | | 1.4 | 125 | 260 | 28 | 93 |
| Example 3 | 38 28 | 0.49 | Sintered plate | 16° | 120 | 30 | 0.8 | | 1.4 | 165 | 295 | 35 | 98 |
| Example 4 | 38 28 | 0.35 | Sintered plate | 16° | 70 | 30 | 0.8 | | 1.4 | 95 | 210 | 22 | 99 |
| Example 5 | 38 28 | 0.40 | Sintered plate | 30° | 90 | 30 | 0.8 | | 1.4 | 125 | 260 | 28 | 96 |
| Example 6 | 38 28 | 0.40 | Sintered plate | 16° | 90 | 15 | 0.8 | | 1.4 | 125 | 280 | 30 | 95 |
| Example 7 | 38 28 | 0.40 | Sintered plate | 16° | 90 | 40 | 0.8 | | 1.4 | 125 | 240 | 25 | 99 |
| Example 8 | 38 28 | 0.40 | Sintered plate | 16° | 90 | 30 | 10.0 | | 1.4 | 125 | 260 | 28 | 99 |
| Example 9 | 38 28 | 0.40 | Sintered plate | 16° | 90 | 30 | 0.1 | | 1.4 | 125 | 260 | 28 | 97 |
| Example 10 | 38 28 | 0.42 | Sintered plate | 16° | 90 | 30 | 0.8 | | 1.25 | 130 | 240 | 25 | 99 |
| Example 11 | 38 28 | 0.38 | Sintered plate | 16° | 90 | 30 | 0.8 | | 1.5 | 120 | 270 | 29 | 96 |
| Example 12 | 20 20 | 0.40 | Sintered plate | 16° | 90 | 30 | 0.8 | | 1.4 | 125 | 240 | 10 | 99 |
| Example 13 | 55 55 | 0.40 | Sintered plate | 16° | 90 | 30 | 0.8 | | 1.4 | 125 | 280 | 84 | 99 |
| Example 14* | 38 28 | 0.40 | Coated electrode | Random | 90 | 50 | 0.5 | | 1.4 | 125 | 140 | 14 | 93 |
| Example 15* | 38 28 | 0.40 | Sintered plate | 68° | 90 | 1 | 0.3 | | 1.4 | 180 | 310 | 35 | 70 |

Symbol * represents a comparative example

Example 16

A battery was produced and the pulse cycle performance was evaluated as in Example 1 except that a positive electrode plate (porosity 10%) with the specifications shown in Table 4 was produced. Further, the rate performance was evaluated according to the following procedures.

Rate Performance (i) The battery was charged at a rate of 0.2 C under a constant current until the battery voltage reached 4.3 V, was charged under a constant voltage until the current value reached a rate of 0.05 C, and then was discharged at a rate of 0.2 C until the voltage reached 3.0 V. This charge/discharge cycle was repeated three times in total to measure the discharge capacities. The averaged value was defined as a 0.2 C discharge capacity.

(ii) The battery was charged at a rate of 0.2 C under a constant current until the battery voltage reached 4.3 V, was charged under a constant voltage until the current value reached a rate of 0.05 C, and then was discharged at a rate of 1.0 C until the voltage reached 3.0 V. This charge/discharge cycle was repeated three times in total to measure the discharge capacities. The averaged value was defined as a 1.0 C discharge capacity.

(iii) The 1.0 C discharge capacity was divided by the 0.2 C discharge capacity and multiplied by 100, to give a rate performance (%).

The results were as shown in Table 4. For comparison, Table 4 also shows data on Examples 6, 1, and 7 concerning positive electrode plates with porosities of 15%, 30%, and 40%. It was found from this that, in the case of using the positive electrode plate 16 containing a plurality of primary grains composed of lithium complex oxide wherein the plurality of primary grains were oriented at an average orientation angle of over than 0° to 30° or less with respect to the plate face of the positive electrode plate, the battery performance (such as the rate performance and the pulse cycle performance) was further improved by controlling the porosity of the positive electrode plate 16 to a comparatively high porosity range of 15% to 40% rather than a low porosity range (about 10%).

What is claimed is:

1. A lithium secondary battery comprising:
    a positive electrode plate which is a lithium complex oxide sintered plate;
    a negative electrode layer containing carbon;
    a separator interposed between the positive electrode plate and the negative electrode layer; and
    an electrolytic solution with which the positive electrode plate, the negative electrode layer, and the separator are impregnated,
    wherein the positive electrode plate has a thickness of 70 to 120 μm, the negative electrode layer has a thickness of 90 to 170 μm, the lithium secondary battery has a rectangular flat plate shape with each side having a length of 20 to 55 mm, the lithium secondary battery has a thickness of 350 to 500 μm, and the lithium secondary battery has an energy density of 200 to 300 mWh/cm$^3$.

2. The lithium secondary battery according to claim 1, wherein the lithium secondary battery is a thin secondary battery that is configured to be built in a card.

3. The lithium secondary battery according to claim 1, wherein the lithium complex oxide is lithium cobaltate.

4. The lithium secondary battery according to claim 1, wherein the lithium complex oxide sintered plate has a porosity of 3 to 40%.

5. The lithium secondary battery according to claim 1, wherein the lithium complex oxide sintered plate has a mean pore diameter of 15 μm or less.

6. The lithium secondary battery according to claim 1, wherein the lithium complex oxide sintered plate is an oriented positive electrode plate containing a plurality of primary grains composed of the lithium complex oxide, the plurality of primary grains being oriented at an average orientation angle of over 0° and 30° or less with respect to the plate face of the positive electrode plate.

7. The lithium secondary battery according to claim 1, wherein the negative electrode layer has a density of 1.15 to 1.50 g/cm$^3$.

8. The lithium secondary battery according to claim 1, further comprising a pair of exterior films having outer peripheral edges sealed with each other to form an internal space, the internal space accommodating the positive electrode plate, the negative electrode layer, the separator, and the electrolytic solution.

9. The lithium secondary battery according to claim 8, wherein each of the exterior films is a laminate film containing a resin film and a metal foil.

10. The lithium secondary battery according to claim 1, wherein the separator is made of polyolefin, polyimide, or cellulose.

11. The lithium secondary battery according to claim 1, further comprising a positive electrode current collector and a negative electrode current collector.

TABLE 4

| | Battery outline | | | Positive electrode plate | | | | Negative electrode | | Battery performance | |
|---|---|---|---|---|---|---|---|---|---|---|---|
| | Size (mm) | Thickness (mm) | Form | Average orientation angle | Thickness (μm) | Porosity (%) | Mean porosity (μm) | Density (g/cm$^3$) | Thickness (μm) | Rate performance (%) | Pulse cycle performance (%) |
| Example 16 | 38  28 | 0.40 | Sintered plate | 16° | 90 | 10 | 0.8 | 1.4 | 125 | 65 | 87 |
| Example 6 | 38  28 | 0.40 | Sintered plate | 16° | 90 | 15 | 0.8 | 1.4 | 125 | 86 | 95 |
| Example 1 | 38  28 | 0.40 | Sintered plate | 16° | 90 | 30 | 0.8 | 1.4 | 125 | 97 | 99 |
| Example 7 | 38  28 | 0.40 | Sintered plate | 16° | 90 | 40 | 0.8 | 1.4 | 125 | 99 | 99 |

12. A card with built-in battery, comprising:
a resin substrate; and
the lithium secondary battery according to claim 1, the lithium secondary battery being embedded within the resin substrate.

* * * * *